(12) United States Patent
Gordaninejad et al.

(10) Patent No.: US 7,364,022 B2
(45) Date of Patent: Apr. 29, 2008

(54) CONTROLLABLE MAGNETO-RHEOLOGICAL FLUID DEVICES FOR MOTION-DAMPING

(75) Inventors: Faramarz Gordaninejad, Reno, NV (US); Xiaojie Wang, Reno, NV (US); Gregory Hitchcock, Reno, NV (US); Barkan M. Kavlicoglu, Reno, NV (US); Krishna Kiran Bangrakulur, Kalamazoo, MI (US)

(73) Assignee: University of Nevada, Reno, NV (US)

( * ) Notice: Subject to any disclaimer, the term of this patent is extended or adjusted under 35 U.S.C. 154(b) by 182 days.

(21) Appl. No.: 11/098,956

(22) Filed: Apr. 4, 2005

(65) Prior Publication Data
US 2006/0016649 A1    Jan. 26, 2006

Related U.S. Application Data

(60) Provisional application No. 60/559,387, filed on Apr. 2, 2004.

(51) Int. Cl.
*F16F 9/53* (2006.01)
(52) U.S. Cl. .................... 188/267.2; 188/267
(58) Field of Classification Search ............... 188/267, 188/267.2
See application file for complete search history.

(56) References Cited

U.S. PATENT DOCUMENTS

| 3,362,508 A | 1/1968 | Mayer |
| 3,672,474 A | 6/1972 | Mayer et al. |
| 4,679,775 A | 7/1987 | Funaki et al. |
| 5,158,109 A | 10/1992 | Hare, Sr. |
| 5,236,186 A * | 8/1993 | Weltin et al. ......... 267/140.15 |

(Continued)

FOREIGN PATENT DOCUMENTS

DE    3306180    8/1984

(Continued)

OTHER PUBLICATIONS

Lemaire et al., "Yield Stress and wall effects in magnetic colloidal suspensions," *J. Phys. D, Appl. Phys.* 24:1473-1477 (1991).

(Continued)

*Primary Examiner*—Pam Rodriguez
(74) *Attorney, Agent, or Firm*—Klarquist Sparkman, LLP

(57) ABSTRACT

Variably controllable motion-damping devices are disclosed that utilize a magneto-rheological fluid (MRF). One configuration of such a device includes a first valving region and a second valving region connected to the first valving region. Between the first and second valving regions is a plate having a first surface adjacent the first valving region and a second surface adjacent the second valving region. At least one of the first and second surfaces is treated to impart a significantly increased shear yield stress to columnized MRF particles passing over the surface, compared to an otherwise similar untreated surface. An MRF is contained in the first and second valving regions such that the MRF can flow through the first and second valving regions. Motion of a first object relative to a second object is damped by causing flow of MRF through the first and second valving regions. A magnet produces a magnetic field within at least one of the valving regions. MRF flow is constrained by the magnetic field and the treated surface sufficiently to damp the relative motion.

8 Claims, 7 Drawing Sheets

U.S. PATENT DOCUMENTS

| | | | |
|---|---|---|---|
| 5,277,281 A * | 1/1994 | Carlson et al. | 188/267 |
| 5,277,283 A | 1/1994 | Yamaoka et al. | |
| 5,284,330 A * | 2/1994 | Carlson et al. | 267/140.14 |
| 5,316,114 A | 5/1994 | Furuya et al. | |
| 5,316,272 A | 5/1994 | Davis | |
| 5,398,917 A | 3/1995 | Carlson et al. | |
| 5,584,367 A | 12/1996 | Berdut | |
| 6,019,201 A | 2/2000 | Gordaninejad et al. | |
| 6,086,060 A | 7/2000 | Berthold | |
| 6,131,709 A * | 10/2000 | Jolly et al. | 188/267.2 |
| 6,151,930 A | 11/2000 | Carlson | |
| 6,340,153 B1 | 1/2002 | Miesner | |
| 6,378,671 B1 * | 4/2002 | Carlson | 188/267.2 |
| 6,419,057 B1 * | 7/2002 | Oliver et al. | 188/267.2 |
| 6,427,813 B1 * | 8/2002 | Carlson | 188/267.2 |
| 6,471,018 B1 * | 10/2002 | Gordaninejad et al. | 188/267.1 |
| 6,497,309 B1 | 12/2002 | Lisenker | |
| 6,510,929 B1 * | 1/2003 | Gordaninejad et al. | 188/267.2 |
| 6,581,740 B2 | 6/2003 | Szalony | |
| 6,681,905 B2 | 1/2004 | Edmondson et al. | |
| 6,722,480 B2 * | 4/2004 | Carlson | 188/267.2 |
| 6,953,108 B2 * | 10/2005 | Anderfaas et al. | 188/267.2 |
| 6,981,577 B2 * | 1/2006 | Katayama et al. | 188/267.2 |
| 2002/0092721 A1 | 7/2002 | Oliver et al. | |
| 2003/0159897 A1 | 8/2003 | Oliver et al. | |
| 2004/0195062 A1 * | 10/2004 | Anderfaas et al. | 188/267.2 |
| 2004/0256185 A1 | 12/2004 | Barbison | |
| 2005/0011710 A1 | 1/2005 | Hitchcock et al. | |
| 2005/0072638 A1 | 4/2005 | Kim | |

FOREIGN PATENT DOCUMENTS

| | | |
|---|---|---|
| JP | 61-211545 | 9/1986 |
| WO | WO 99/27273 | 6/1999 |

OTHER PUBLICATIONS

Monkman, "Addition of solid structures to electrorheological fluids," *J. Rheol.* 35(7):1385-1392 (1991).

Gorodkin et al., "Surface Shear Stress Enhancement under MR Fluid Deformation," *Proc. 8$^{th}$ Intl. Conf. on Electrorheol. Fluids and Magnetorheol. Susp.* pp. 847-852, Nice, France (2001).

Abu-Jdayil et al., "Effect of Electrode Morphology on the Behaviour of Electrorheoloical Fluids in Torsional Flow," *J. Intell. Matl. Syst. & Struc.* 13:3-11 (2002).

* cited by examiner

CONTROLLABLE MAGNETO-RHEOLOGICAL FLUID DEVICES FOR MOTION-DAMPING

CROSS REFERENCE TO RELATED APPLICATION

This application claims the benefit of prior pending U.S. Provisional Patent Application No. 60/559,387, filed Apr. 2, 2004, which is herein incorporated by reference.

FIELD

The present application is directed to, inter alia, vibration- and motion-dampers, and more particularly, to controllable magneto-rheological fluid dampers.

BACKGROUND

During the past decade there has been increasing interest in the development of controllable shock absorbers, vibration-dampers, and the like that utilize electro-rheological fluid (ERF) or magneto-rheological fluid (MRF). The possibility of using ERF- or MRF-based damping devices in various applications has made these controllable devices attractive to the vibration-control field. Controllable energy-dissipation devices can potentially be used in a variety of mechanical and structural systems such as bicycles, motorcycles, automobiles, trucks, ships, trains, airplanes, bridges, buildings, sports equipment, and any of various other systems or structures requiring vibration control.

In an MRF, micron-sized, magnetically polarized particles are suspended in a carrier fluid such as silicone oil or mineral oil. MRF is capable of responding to an applied magnetic field in a few milliseconds. The material properties of an MRF can change rapidly by increasing or decreasing the intensity of the applied magnetic field. The material property can be viewed as a controllable change in the apparent viscosity of the fluid by varying the current supplied to, for example, an adjacent electromagnet. A higher fluid apparent viscosity can be exploited to provide a higher damping force or pressure-drop across an MRF valve. This is the phenomenon behind the controllability of MRF dampers and related devices.

Certain types of MRF dampers, such as described in U.S. Pat. No. 5,277,281 to Carlson et al. and U.S. Pat. No. 6,510,929 to Gordaninejad et al., are known in the art. However, these dampers exhibit various drawbacks and/or application limitations.

Different parameters and variables within an MRF valve can affect MRF valve performance. For example, the shear yield stress of different magnetic colloidal suspensions has been measured by Lemaire and Bossis utilizing different rheometer plate materials. Lemaire and Bossis, "Yield Stress and Wall Effects in Magnetic Colloidal Suspensions," *J. Phys. D, Appl. Phys.* 24:1473-1477, 1991. The roughness and material of the rheometer plates were varied to produce wall effects. Two paramagnetic plate surfaces, stainless steel and glass, and one ferromagnetic plate surface, iron, were investigated. The smooth surfaces of glass plates produced almost zero yield stress. Stainless steel plates produced higher yield stress, basically due to the roughness of the surface. The roughness of the stainless steel and iron plates were identical; however, due to wall interactions of the fluid with the iron plates, the highest yield stress was observed with iron plates.

Increased torque performance of an ERF clutch has been achieved by attaching porous fabric materials to the clutch surfaces. Monkman, "Addition of Solid Structures to Electrorheological Fluids," *J. Rheol.* 35(7):1385-1392, 1991. The increase was attributed to increased electroviscosity due to fabric polarization. Efforts to increase the performance of MRF and ERF by structured modifications in torsional flow modes were reported by Gorodkin et al., "Surface Shear Stress Enhancement under MR Fluid Deformation," *Proc. 8$^{th}$ Intl. Conf. on Electrorheol. Fluids and Magnetorheol. Susp.* pp. 847-852, Nice, France, 2001, and by Abu-Jdayil et al., "Effects of Electrode Morphology on the Behavior of Electrorheological Fluids in Torsional Flow," *J. Intell. Matl. Syst. & Strmt.* 13:3-11, 2002, respectively. Gorodkin et al. studied the effects of radial and circumferential grooves on a magnetorheometer, and showed that a circumferential groove did not increase measured torque because the grooves were parallel to the flow direction. However, radial grooves that were perpendicular to the torsional flow created an increased shear stress.

SUMMARY

Disclosed below are representative embodiments that are not intended to be limiting in any way. Instead, the present disclosure is directed toward novel and nonobvious features, aspects, and equivalents of the disclosed embodiments of the controllable magneto-rheological fluid devices as described below. The disclosed features and aspects of the embodiments can be used alone or in various novel and nonobvious combinations and sub-combinations with one another.

Embodiments of a controllable magneto-rheological fluid (MRF) device for variably controlling the flow of MRF in passages within the device are herein described. The characteristics of an MRF flowing through the passages can be controlled by subjecting the MRF to a magnetic field of a selectively variable strength. The magnetic field causes ferrous particles within the MRF to form chain-like structures which can adhere to or otherwise interact with one or more surfaces of a fluid passage to create or change a shear yield stress in the passage that resists the flow of the MRF. Increasing the surface area of a passage can increase the shear yield stress. Accordingly, in some aspects of embodiments of the device, two passages are provided in series to optimize the controllability of the MRF flow through the device. Furthermore, in some aspects, one or more surfaces of a passage through which the MRF flows can be surface-treated to increase, decrease, or otherwise alter the controllability of the MRF flow.

Specific embodiments of a motion damping device for damping motion of a first object relative to a second object can comprise a first valving region and a second valving region that is coupled to the first valving region. The device can also comprise a plate positioned between the first and second valving regions. The plate can have a first surface adjacent the first valving region and a second surface adjacent the second valving region. At least one of the first and second surfaces can comprise a surface that has been treated so as to impart a significantly increased shear yield stress to columnized MRF particles passing over the surface, compared to an otherwise similar untreated surface. (A "significant" increase is one that is measurable and that represents at least an incremental increase that is favorable from an application point of view. The magnitude of a "significant" increase depends upon various factors such as the size of the MRF device and the magnitude and direction of forces associated with the movement to be damped, etc.)

The device can also comprise a magneto-rheological fluid (MRF) contained in the first and second valving regions in a manner allowing the MRF to flow through the first and second valving regions. Motion of the first object relative to the second object causes a flow of MRF through the first and second valving regions. Also, the device can include a magnet configured to produce a magnetic field within at least one of the first and second valving regions. The flow of MRF is constrained by the magnetic field and the treated surface sufficiently to damp the motion of the first object relative to the second object. As used herein, "motion" can include motion of a nature that is termed "vibration" in the art.

By way of example, the treated surface can comprise a first set of parallel grooves that extend in a first direction and a second set of parallel grooves that extend in a second direction perpendicular to the first direction.

In certain embodiments the first object can be a piston and the second object can be a cylindrical housing in which the piston is movably disposed. In some implementations, at least the first valving region, the second valving region, and the plate can be contained within the piston. In this configuration the magnet can be associated with at least one of the valving regions. The magnet can be contained within the piston. In other implementations, at least the first valving region, the second valving region, and the plate are external to the piston, wherein the magnet is associated with at least one of the valving regions. In specific embodiments, the external components are contained within an external housing mounted to the piston housing.

In certain embodiments the first valving region can comprise a first generally disk-shaped space, and the second valving region can comprise a second generally disk-shaped space. The first valving region and the second valving region can be, but need not be, parallel to each other. Also, the valve plate can be, but need not be, generally disk-shaped.

The magnet can be an electromagnet that includes an electromagnetic coil. Alternatively, for example, the magnet can be a permanent magnet that is either stationary or movable relative to the at least one valving region. In some embodiments, the magnet can be an electromagnet, a permanent magnet, or combination of both.

Certain embodiments of a damping device for damping movement of a first object relative to a second object comprises a valving region and a valve plate that is adjacent the valving region. The valve plate has a treated surface that defines a boundary of the valving region. The treated surface of the valve plate is configured to impart a significantly increased shear yield stress to columnized MRF particles passing over the surface, compared to an otherwise similar untreated surface. The device also includes a magneto-rheological fluid (MRF) contained in the valving region in a manner allowing the MRF to flow through the valving region and across the treated surface. A magnet configured to produce a magnetic field within at least the valving region is also included. Movement of the first object relative to the second object causes a flow of MRF through the first valving region, in which the flow is constrained by the magnetic field and the treated surface sufficiently to damp the motion of the first object relative to the second object.

In certain embodiments the valving region includes a first valving region and a second valving region, wherein the valve plate is positioned between the first and second valving regions. The first valving region can comprise a first generally disk-shaped space, and the second valving region can comprise a second generally disk-shaped space. In some implementations, the first valving region and the second valving region are parallel to each other. The treated surface can be a first-valve plate surface, wherein the valve plate further comprises a second valve-plate surface defining a boundary of the second valving region. In some implementations, the valve-plate second surface comprises a treated surface.

The treated surface can comprise a first set of parallel grooves that extend in a first direction and a second set of parallel grooves extending in a second direction perpendicular to the first direction. Other surface-treatment schemes alternatively can be employed to increase the surface roughness compared to an untreated surface.

The first object can be a piston and the second object can be a cylindrical housing in which the piston is movably disposed. In other embodiments, the first object can be a mass to which the piston is attached, and the second object can be a mass to which the cylinder is attached. In some implementations, the first valving region, the second valving region, and the plate can be contained within the piston. In other implementations, the first valving region, the second valving region, and the plate are external to the cylindrical housing.

Certain embodiments of a motion-damping device have a movable piston that comprises a first valving stage comprising a first primary valving region that is coupled to a first secondary valving region. A first valve plate is positioned between the first primary valving region and the first secondary valving region. The device also comprises a second valving stage in series with the first valving stage, the second valving stage comprising a second primary valving region that is coupled to a second secondary valving region. A second valve plate is positioned between the second primary valving region and the second secondary valving region. The device also comprises a magneto-rheological fluid (MRF) contained in the first and second primary valving regions and the first and second secondary valving regions in a manner allowing the MRF to flow through these valving regions. The device includes a first magnet configured to produce a magnetic field within at least one of the first primary valving region and the first secondary valving region, and a second magnet configured to produce a magnetic field within at least one of the second primary valving region and the second secondary valving region. Motion of the piston can be damped by the flow of MRF through the first primary and secondary valving regions and the second primary and secondary valving regions as the first and second magnets produce their respective magnetic fields. The magnets need not produce the respective magnetic fields simultaneously.

Furthermore, the first valve plate can comprise a first surface defining a boundary of the first primary valving region and a second surface defining a boundary of the first secondary valving region. The second valve plate can comprise a first surface defining a boundary of the second primary valving region and a second surface defining a boundary of the second secondary valving region. In some implementations, at least one of the first and second surfaces of the first and second valve plates comprises a treated surface. The treated surface is configured to impart a significantly increased shear yield stress to columnized MRF particles passing over the surface, compared to an otherwise similar untreated surface.

In certain embodiments the piston is movably disposed within a cylindrical housing. In such configurations the first and second primary valving regions, the first and second secondary valving regions, and the first and second valve plates can be contained within the piston or located externally to the cylindrical housing. The first and second magnets can each include electromagnetic coils.

The foregoing and other objects, features, and advantages of the invention will become more apparent from the following detailed description, which proceeds with reference to the accompanying figures.

DETAILED DESCRIPTION

Described below are embodiments of controllable magneto-rheological fluid (MRF) devices in which the flow of MRF in respective passages within the devices are variably controlled. Generally, an MRF as known in the art contains ferrous particles that form chain-like columns when the fluid is subjected to a magnetic field. The columns are generally oriented parallel to the direction of the magnetic field flux lines. For optimal effect, the flux lines desirably are at an approximately 90-degree angle to surfaces of a valving region, or approximately perpendicular to the direction of MRF flow through the valving region. The chains of ferrous particles thus oriented effectively increase the viscosity of the MRF as the MRF flows through the valving region. The increased apparent viscosity generally results in an increased pressure drop between an entrance and an exit of a valving region, which increases the damping force of the MRF device.

Figure 1:
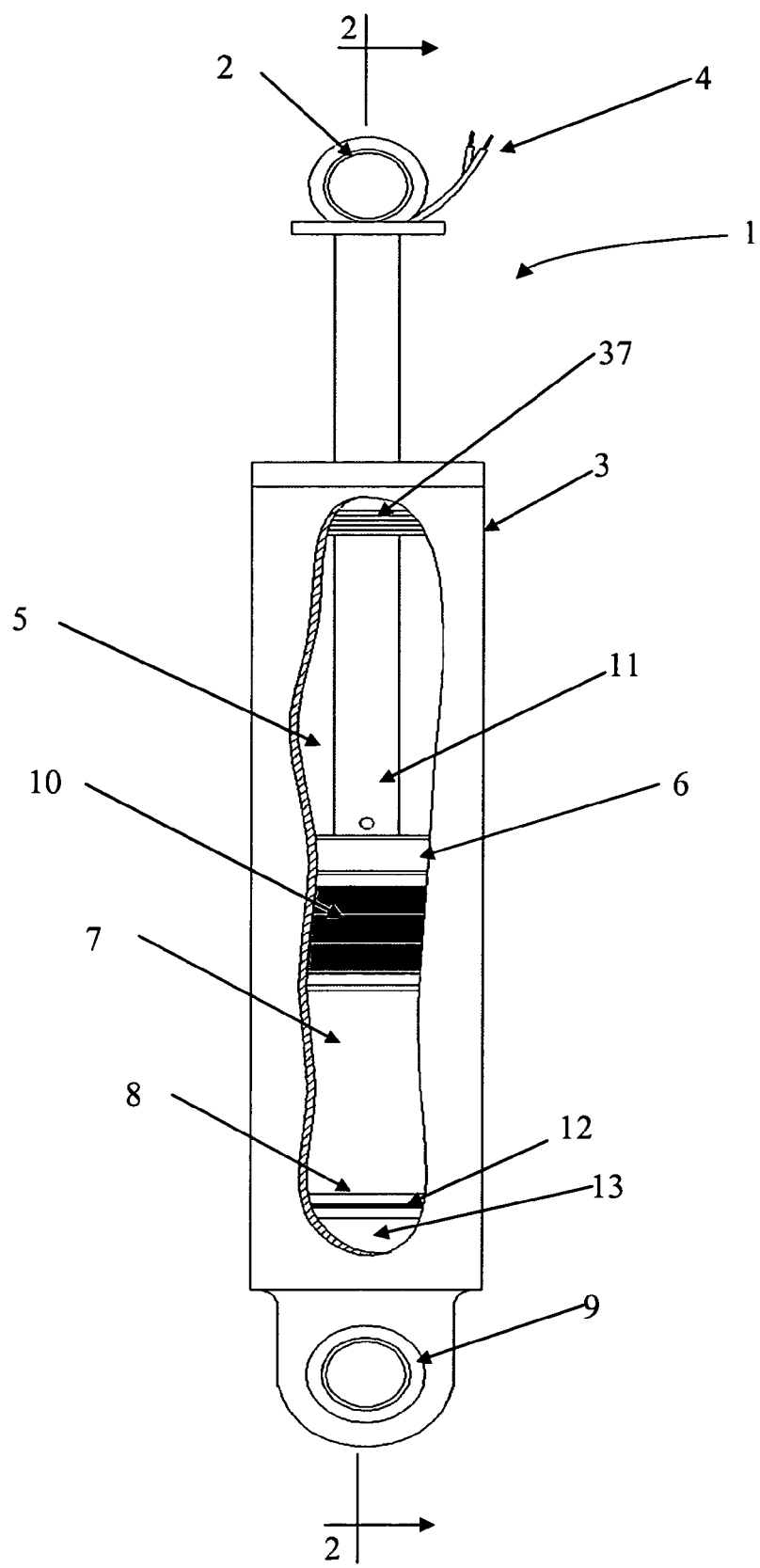
FIG. 1 shows a partial cross-sectional view of a motion-damper according to one embodiment of the present application.

Referring to FIG. 1, an embodiment of a controllable MRF device 1 includes a work cylinder 3 and an internal work piston 6 positioned within the work cylinder. The work cylinder 3 defines an internal compression chamber 7 on one side of the work piston 6 and an internal rebound chamber 5 on the other side 4 of the work piston 6 as shown. The compression chamber 7 and the rebound chamber 5 are at least substantially filled with an MRF, such as one generally known in the art. The work piston 6 includes outer (circumferential) seals configured to create a sealed barrier between the rebound chamber 5 and the compression chamber 7 and allow the work piston to move axially within the work cylinder 3 while maintaining the sealed barrier.

The MRF device 1 further includes a piston rod 11 with an internal end coupled to the piston 6 within the work cylinder 3, and an external end extending to outside the work cylinder 3. The work cylinder 3 includes an end cap 37 threadably coupled to the cylinder. The end cap 37 defines an opening through which the piston rod 11 extends. A seal (not detailed, but well understood in the art of, e.g., hydraulic pistons) is provided around the opening to seal the opening against the piston rod 11 to prevent MRF from leaking out of the work cylinder 3.

In some embodiments, a mounting element, such as rod ring 2 or rod clevis, is attached to or integrated into the external end of the piston rod 11. The mounting element, or rod ring 2, is generally configured to be coupled to a structure or mass that moves in the axial direction of the MRF devices relative to the work cylinder 3. Furthermore, a mounting element, such as fixed support ring 9 or fixed clevis, can be attached to or integrated into the work cylinder 3 and configured to be coupled to a fixed structure or mass. The MRF device 1 is thus configured such that movement of the movable structure is relative to the fixed structure in the axial direction correspondingly moves the work piston 6 within the work cylinder 3 in the axial direction. Axial movement of the work piston 6 results in the displacement of MRF contained within the device 1.

Figure 3:
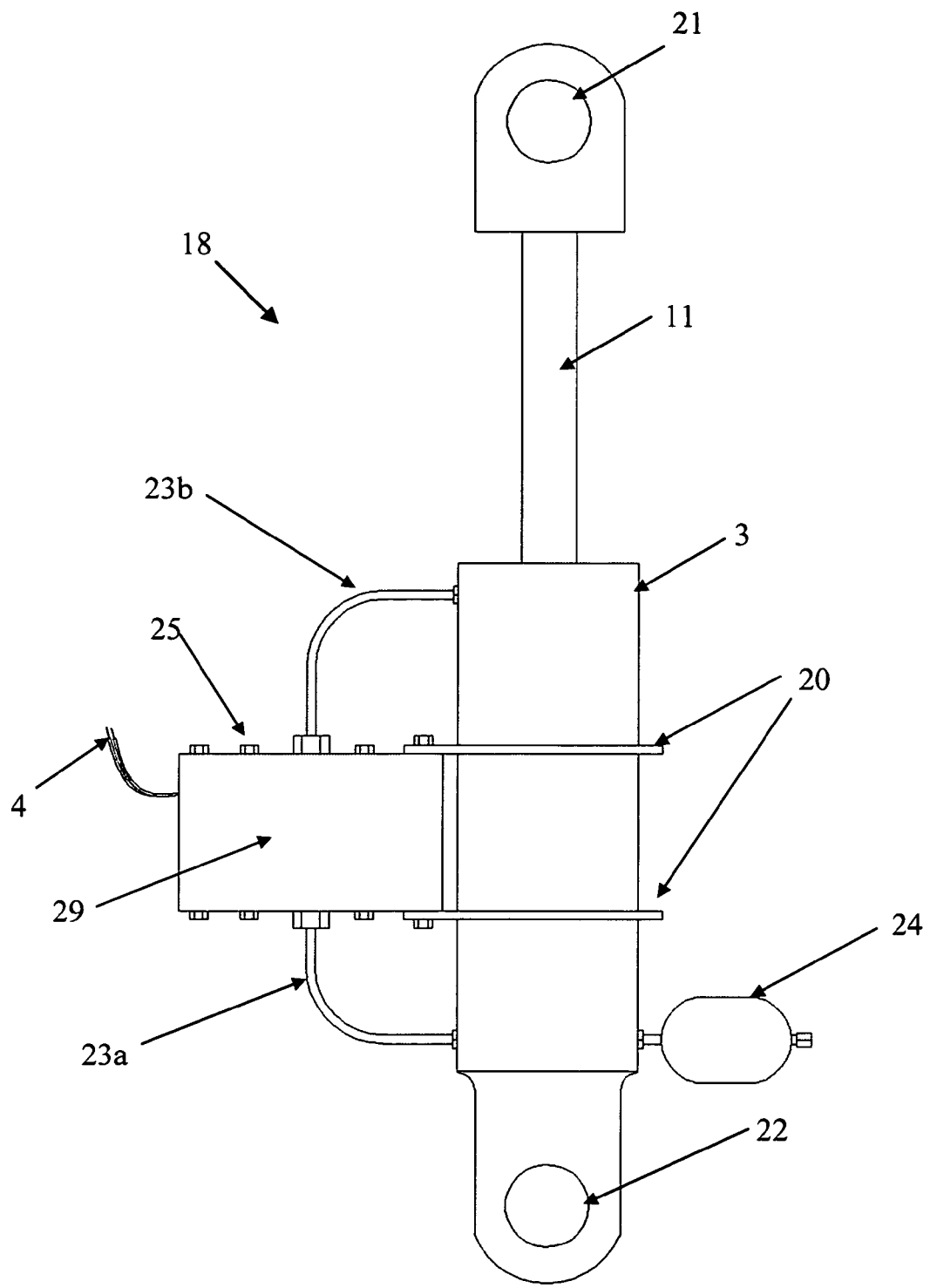
FIG. 3 is a side elevational view of a motion-damper according to one embodiment having an external MRF by-pass valve and a satellite accumulator.

The MRF device 1 includes an accumulator that comprises an accumulator piston 8 and an accumulator chamber 13 that are situated "below" the work piston 6 and compression chamber 7 in the figure. As the work piston 6 compresses, i.e., moves axially in a direction toward the support ring 9, the accumulator accommodates for the added volume of the piston rod 11. Specifically, the accumulator piston 8 moves in the same axial direction as the work piston 6 and compresses a gas in the accumulator chamber 13. The gas can be, for example, air or nitrogen. The accumulator chamber 13 contains a predetermined amount of gas sufficient to accommodate the volume of the piston rod 11 over the full stroke of the piston rod. The accumulator piston 8 includes a circumferential seal 12 that prevents the gas from leaking into the compression chamber 7 and prevents the MRF from leaking into the accumulator chamber 13. Alternatively to the FIG. 1 embodiment, the accumulator can be external as shown in FIG. 3 and described in more detail below.

Figure 2:
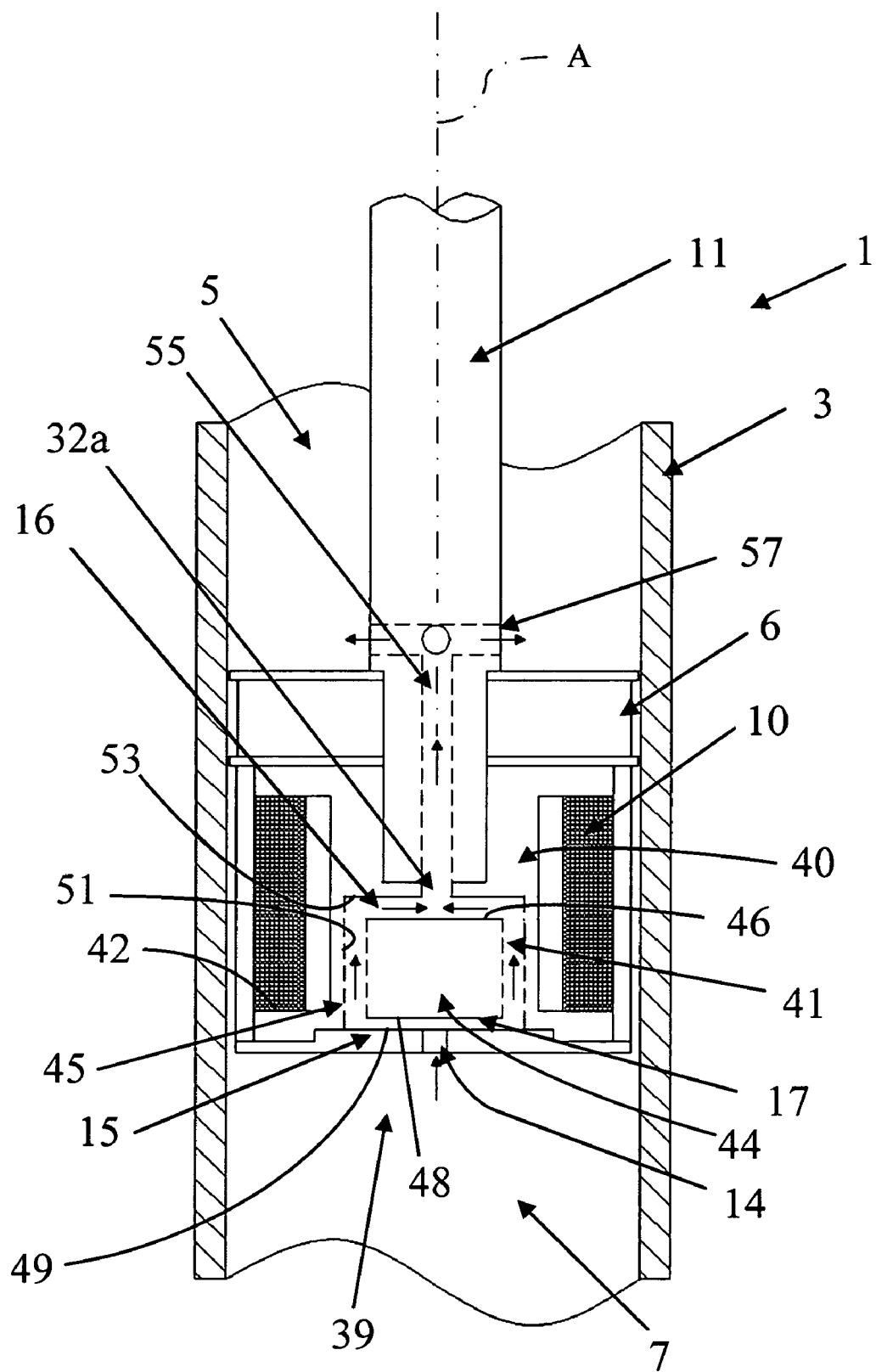
FIG. 2 is a partial cross-sectional view, along the line 2-2 in FIG. 1, showing an internal magneto-rheological fluid (MRF) damper valve.

The MRF device 1 includes a magnetic element configured to produce a magnetic field having a flux oriented through the device in a direction generally parallel to the axis of the device. In the FIG. 1 embodiment (with a portion of the piston removed for illustrative purposes), the magnetic element is a wound magnetic coil 10 positioned within the work piston 6. As detailed in FIG. 2, the coil 10 is wound around a coil-receiving portion 42 formed in a piston-support member 40. Alternatively, in certain embodiments, the magnetic element can be a wound magnetic coil 10 positioned coaxially around the exterior of at least a portion of work cylinder 3. Although the magnetic element shown in FIGS. 1 and 2 is a wound magnetic coil, it is recognized that any element capable of producing a magnetic field through the MRF device 1 can be used. For example, the use of one or more permanent magnets in place of, or in conjunction with, the electromagnet may be used. Additionally, the use of an electromagnet to counteract the constant magnetic field of one or more permanent magnets (or a converse configuration) can be used to produce a reverse-controlled mode. If one or more permanent magnets are used, they can be mounted so as to be displaceable in position relative to the MRF fluid.

A magnetic field produced by the coil 10 is activated and variably controlled by the application thereto of varying levels of electric current. In other words, the coil 10 in the depicted embodiment is an electromagnetic coil that produces a magnetic field having a magnitude that is proportional to the amplitude of the electric current applied to the coil. The electric current can be applied to the coil 10 via external electrical wire leads 4 (FIG. 1) that are connected to a selectively variable external electrical power source (not shown). In the depicted embodiment, the wire leads 4 extend longitudinally through the piston rod 11 to the coil 10.

As shown in FIG. 2, the work piston 6 includes an internal MRF damper valve indicated generally at 39. The damper valve 39 includes a primary valving region 16 and a secondary valving region 17. The valving regions 16, 17 generally define passageways through which MRF can flow. The valving regions 16, 17 are fluidly coupled to each other by an MRF flow passageway 41 oriented generally in the vertical direction as shown. Generally, the valving regions 16, 17 are each partially bounded by a valve plate 44 affixed within a cavity 45 formed in a piston-support member 40. More specifically, the primary valving region 16 is the space defined between a first major surface 46 of the valve plate 44 and an end surface 53 of the valve plate receiving cavity. The secondary valving region 17 is the space defined between a second major surface 48 of the valve plate 44 and an interior surface 49 of an inlet manifold plate 15.

The valve plate 44 in the depicted embodiment is generally disk-shaped with the first major surface 46 and the second major surface 48 extending radially substantially parallel to each other. The cavity 45 in the piston-support member 40 is generally cylindrically-shaped defined by a vertically extending sidewall surface 51, the end surface 53, and an open end opposite the end surface 53. The diameter of the cavity 45 is larger than the diameter of the valve plate 44 such that, when the valve plate 44 is positioned co-axially within the cavity 45, the peripheral surface of the valve plate 44 and the sidewall surface 51 define the MRF flow passageway 41. It can be appreciated from the foregoing that the primary valving region 16 and the secondary valving region 17 are generally disk-shaped spaces, and the MRF flow passageway 41 is generally a ring-shaped space. This configuration improves the contact area to which MRF ferrous particles formed into chains can adhere. In other words, because the MRF flow is distributed over a larger area around the valve plate 44, more MRF chains can be formed and adhered to the walls of the valving regions 16, 17 for increasing the viscosity of the MRF and improving the damping effects exhibited by the device 1.

Although the primary valving regions and second valving regions shown in the illustrated embodiments define respective generally disk-shaped spaces, it is recognized that one or more of the regions can define respective spaces other than disk-shaped. For example, the regions could have converging, diverging or circular surfaces and define cone-shaped, spherical-shaped, or semi-spherical shaped spaces.

The inlet manifold plate 15 includes an inlet port 14 through which MRF contained in the compression chamber 7 can flow. The inlet port 14 is positioned generally at the center of the manifold plate 15, co-axially with the work cylinder 3 and work piston 6. Although the illustrated embodiment has one inlet port 14, it is recognized that one or more inlet ports can be formed in the inlet manifold plate 15. The piston-support member 40 defines an inner orifice 32a coupled to a piston-rod inner orifice 55 extending through the center of the piston rod 11. The piston-rod inner orifice 55 is connected to one or more exit ports 57 through which MRF can flow into the rebound chamber 5. It will be appreciated that this embodiment permits multiple inlet ports 14 and exit ports 57, thereby allowing for separate compression and rebound flow paths. Thus, the MRF device 1 can achieve different compression and rebound force characteristics if desired. Also, multiple inlet ports and exit ports give greater flexibility in the design of the damping forces by varying the number of inlet and outlet ports.

In operation, during compression of the work piston 6, MRF from the compression chamber 7 enters the internal MRF damper valve 39 by flowing through the inlet port 14 into the secondary valving region 17. The MRF diverges and flows through the secondary valving region 17 from the axis A of the valve plate 44 (coincident with the axis of the piston), radially outward from the axis A toward the MRF flow passageway 41. The MRF then flows through the MRF flow passageway 41, from which the fluid enters the primary valving region 16. Flowing radially inward through the primary valving region 16 toward the axis A, the MRF fluid converges at the axis and flows through the inner orifice 32a and the piston-rod inner orifice 55. The MRF then flows through the exit ports 57 into the rebound chamber 5. In this way, the rebound chamber 5 and the compression chamber 7 are fluidly coupled via the internal MRF damper valve 39.

As MRF flows through the secondary valving region 17 and the primary valving region 16, the electromagnetic coil 10 can be activated to produce a magnetic field in the valving regions. The magnetic field can be represented by magnetic-flux lines extending generally perpendicularly to the direction of the MRF flow as the fluid flows through the valving regions, i.e., perpendicularly to the first and second major surfaces 46, 48 of the valve plate 44. Subjected to the magnetic field, the ferrous particles in the MRF (especially in a stationary fluid) form chain-like columns oriented along or substantially parallel to the magnetic flux lines. The ends of the chain-like columns contact the surfaces of the primary and secondary valving regions 16, 17. The resulting shear yield stress between the surfaces and the chain-like columns acts to resist flow of the MRF through the valving regions 16, 17. The shear yield stress can be increased by increasing the current supplied to the electromagnetic coil 10 and decreased by decreasing the current supplied to the coil. With increased magnetic field, the MRF becomes more viscous, which results in increased damping forces.

The same concepts can be applied to the MRF fluid as it moves in the reverse direction, i.e., from the rebound chamber 5 to the compression chamber 7.

Turning now to the embodiment illustrated in FIG. 3, a controllable MRF device 18 includes a work cylinder 3 and work piston (not shown) positioned within the work cylinder. The MRF device 18, like the embodiment of FIGS. 1 and 2, includes a piston rod 11 coupled to the piston. An external end of the rod includes a rod clevis 21 that can be secured to a movable structure that moves relative to a fixed structure and a fixed clevis 22 that is secured to the fixed structure. The piston of the device 18 functions much like the piston of the MRF device 1 except that MRF in the MRF device 18 is not displaced between a rebound chamber and a compression chamber via the piston, but rather via an external (by-pass) MRF damper valve 25. The work cylinder 3 includes an external accumulator 24 to compensate for potential volume changes within the compression chamber caused by various conditions such as piston rod displacement and temperature changes.

Figure 4:
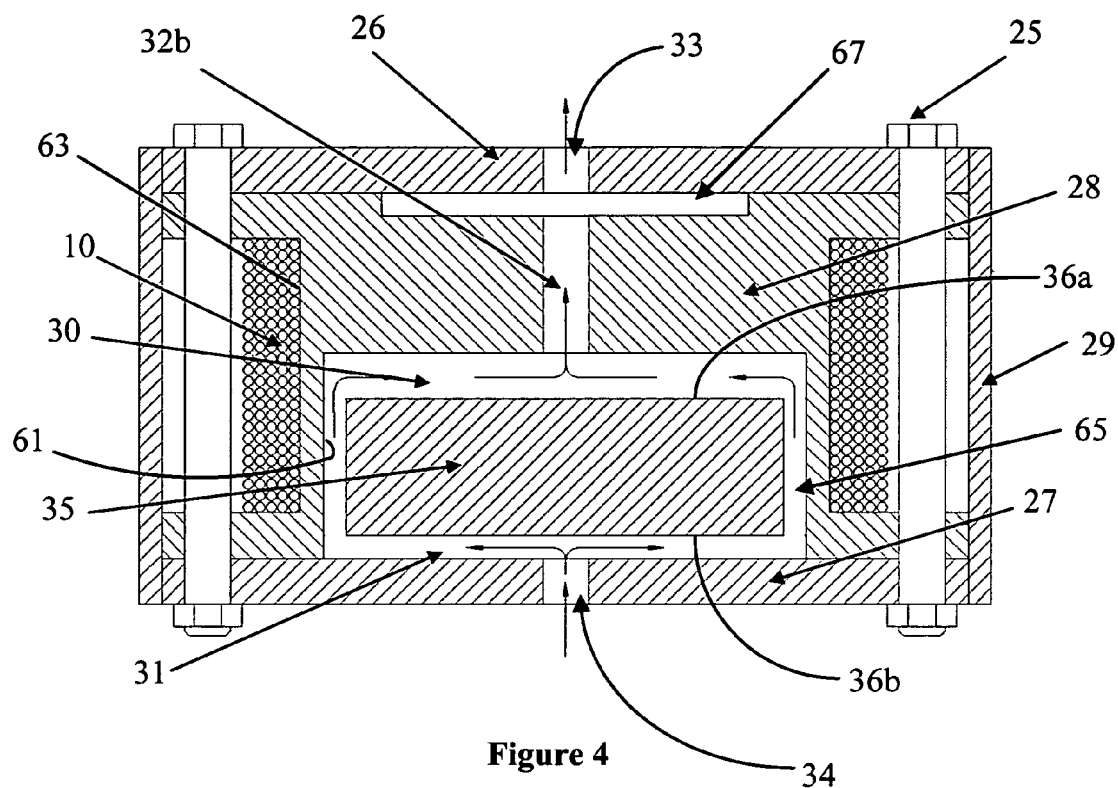
FIG. 4 is a cross-sectional view of the external MRF by-pass valve of the motion-damper of FIG. 3.

The external MRF damper valve 25 shown in FIG. 3 (and detailed in FIG. 4) includes an outer housing 29 with a compression line 23a that couples the compression chamber of the work cylinder 3 with the housing 29 and a rebound line 23b that couples the rebound chamber of the work cylinder 3 with the housing 29. The housing 29 can be mounted to the work cylinder 3 by mounting brackets 20.

The external MRF damper valve 25 comprises components similar to the components of the internal MRF damper valve 39 shown in FIG. 2. Similar to the internal damper valve 39, the external MRF damper valve 25 includes an inlet-manifold plate 27 having an inlet orifice 34; a valve plate 35 with a first surface 36a substantially parallel to an opposing second surface 36b, a support member 28 with a valve-plate receiving cavity 61, a magnet-receiving cavity 63, and an inner orifice 32b; and an electromagnetic coil 10 wrapped coaxially within the magnet-receiving cavity 63. The internal damper valve 25 also includes an outlet-manifold plate 26 that defines an outlet orifice 33.

The external MRF damper valve 25 operates in a manner similar to the internal MRF damper valve 39 except that MRF from the compression chamber of the work cylinder 3 enters the damper valve 25 through the inlet orifice 34 via the compression line 23a. The MRF then flows through a secondary valving region 31 defined between the second surface 36b of the valve plate 35 and an interior surface of the inlet-manifold plate 27. The MRF then flows through an MRF passageway 65 defined between the peripheral surface of the valve plate 35 and a sidewall surface of the valve-plate receiving cavity 61. The MRF then flows through the primary valving region 30 and enters the inner orifice 32b. The MRF exits the external damper valve 25 through the outlet orifice 33 and flows into the rebound chamber of the work cylinder 3 via the rebound line 23b.

Figure 6A:
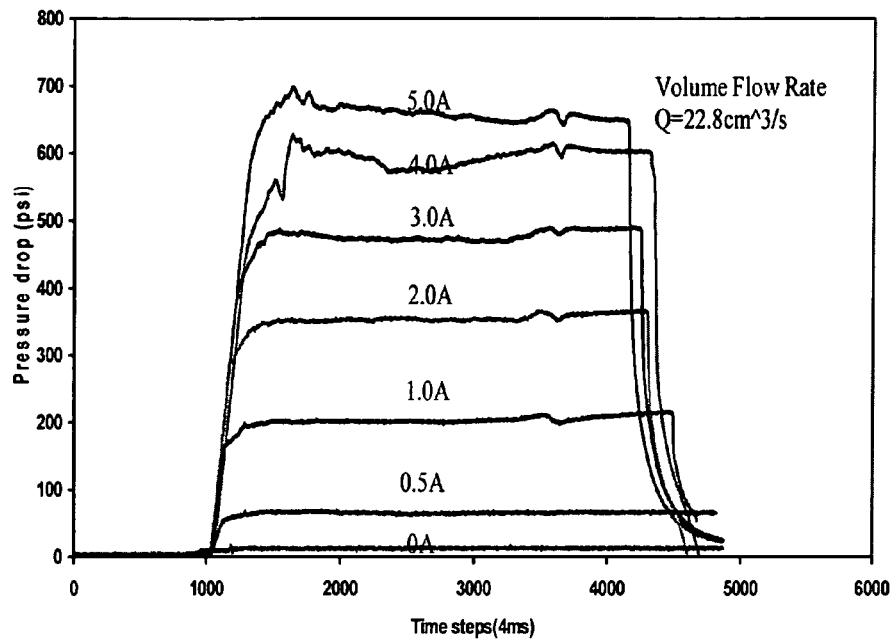
FIG. 6A is a graph illustrating the pressure drop across the MRF by-pass valve of FIG. 5 as a function of time for various activation electrical currents and a constant volumetric flow rate of 22.8 cm$^3$/s.
Figure 6B:
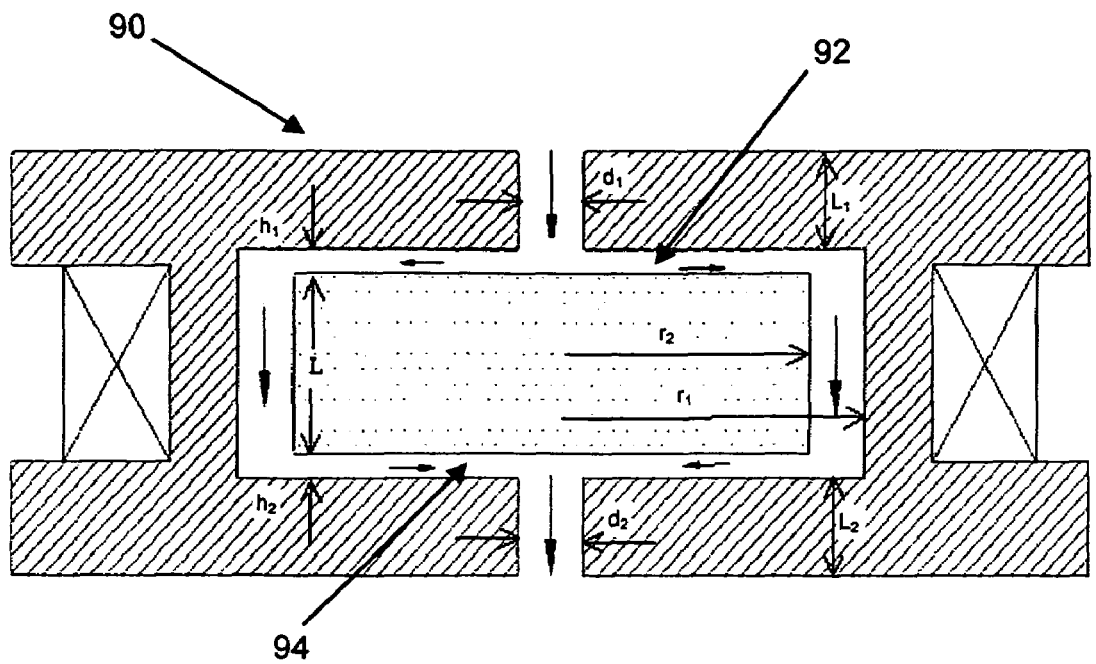
FIG. 6B is a cross-sectional view of an embodiment of an MRF damper valve.

In this embodiment, employing a primary valving region 30 and a secondary valving region 31 provides greater MRF control, and thus provides potentially enhanced performance, compared to only a single primary valving region. As illustrated in the graph of FIG. 6A, a measured pressure drop across the external valve 25 is shown as a function of time for various current amplitudes applied to the magnetic coil 10 and a constant MRF volumetric flow rate. Generally, the pressure drop ($\Delta P_{MR}$) across an MRF valve 90 having a primary valving region 92 and a secondary valving region 94 as shown in FIG. 6B, i.e., symmetrically-shaped valving regions where the primary valving region is substantially the same shape as the secondary valving region, can be calculated by use of the following equation, $$\Delta P_{MR} = 2 * \frac{r_1 - \frac{d_1}{2}}{h_1} \tau_1(B_1) + 2 * \frac{r_2 - \frac{d_2}{2}}{h_2} \tau_2(B_2)$$

where $\tau_1$ and $\tau_2$ are the shear yield stress of the MRF in the primary valving region and the secondary valving region, respectively. As indicated, $\tau_1$ and $\tau_2$ are functions of the applied magnetic field density $B_1$ and $B_2$, respectively. The remaining parameters of the equation are set out in FIG. 6B. As shown by the equation, the contributions of the valving regions 92, 94 on the pressure drop across the MRF valve 90 are dependent on the shear yield stress $\tau_1$ and $\tau_2$ of the MRF in the respective regions.

Although the primary and secondary valving regions of the illustrated embodiments each define a generally symmetrically shaped space and have substantially the same shape as the other, it is recognized that valving regions of other embodiments can be non-symmetrical in shape and be shaped differently, while providing at least the same benefits and advantages of the illustrated embodiments. For example, depending on the application, half of a valving region could be of a disk-shaped space and the opposite half could be half of a cone-shaped space. Also, an MRF valve could have a primary valving region that defines a generally disk-shaped space and a secondary valving region that defines a generally cone-shaped or hemispherical-shaped space. In embodiments where the valving regions are non-symmetrical and/or do not define the same shape, the equation described above would not apply.

For added control, additional MRF cavities can be formed in the MRF valve. For example, multiple MRF damper valves as detailed in FIG. 2 or FIG. 4 can be connected together in tandem such that MRF fluid exiting a first MRF damper valve passes through a second MRF damper valve, etc. Alternatively, one or more "passive" valving cavities, such as valving cavity 67 shown in FIG. 4, can be employed. In the valving cavity 67, MRF fluid flow is at most only partially affected by the applied magnetic field, but nevertheless is forced to assume some radial circulation as the fluid passes from the inner orifice 32b thru the outlet orifice 33. Although not shown, multiple outlet orifices can be positioned at radially outward positions around the valving cavity 67 to improve radial flow of the MRF through the cavity.

As in the internal MRF damper valve 39 of FIG. 2, the magnetic coil 10 of the external MRF damper valve 25 includes wire leads 4 that can be coupled to a power source to energize the magnetic coil 10 for producing a magnetic field through the valve 25. The MRF in the external MRF damper valve 25 behaves in the same manner as the MRF in the internal MRF damper valve 39 as the fluid passes through the magnetic field while flowing through the primary and secondary valving regions 30, 31. Accordingly, the external MRF damper valve 39 is operable to increase the shear yield stress of the MRF particles against the surfaces of the valving regions 30, 31 to increase the viscosity of the MRF, which results in increased damping forces.

Figure 5:
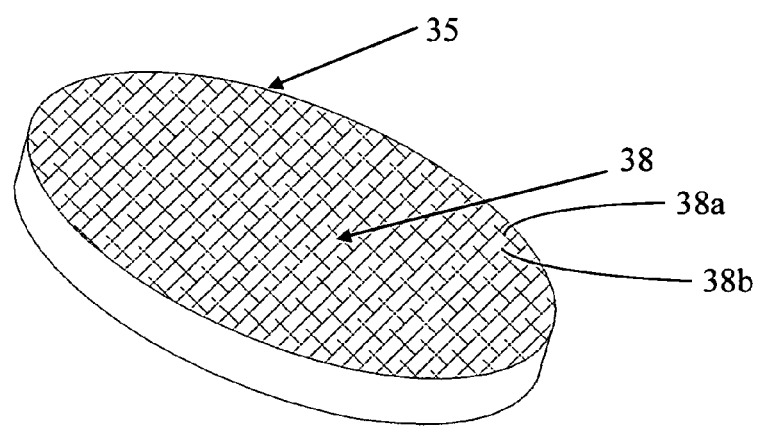
FIG. 5 is a perspective view of a valve plate of the MRF by-pass valve of FIG. 4, in which the valve-plate surface has been treated.

In some embodiments of an internal valve and/or external valve, the first surface and/or second surface of the valve plate can have a surface treatment configured to increase the shear yield stress for a given current supplied to the coil 10. For example, FIG. 5 depicts a valve plate 35, being exemplary of the valve plates of the internal and external valves described herein having a surface treatment 38. The surface treatment 38 shown in FIG. 5 includes a first set of parallel grooves 38a extending in a first direction and a second set of parallel grooves 38b extending in a second direction that is perpendicular to the first direction. The grooves 38a, 38b are thus oriented such that most of the MRF flowing across the surface treatment 38 is generally not flowing parallel to the grooves. Accordingly, the shear yield stress of the MRF flowing through a valving region where the valve plate surface within the valving region has a surface treatment, as shown in FIG. 5, will be greater than if the valve plate surface lacked surface treatment.

Figure 7:
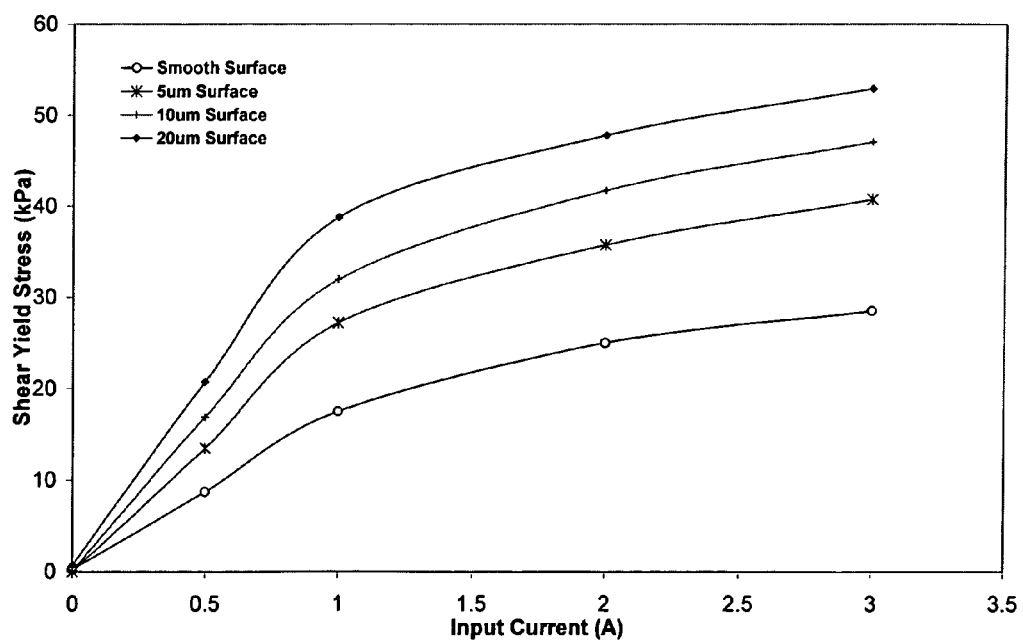
FIG. 7 is a graph illustrating the shear yield stress of activated MRF particles against different surfaces of the MRF by-pass valve of FIG. 4 as a function of activation electrical current for surfaces of varying roughness.

Altering the width and depth of the grooves 38a, 38b can affect the characteristics of the MRF as it flows through the valving regions. As shown in FIG. 7, experimental results show that increasing the groove depth while maintaining the width of the grooves 38a, 38b tends to increase the pressure drop through the valving regions. In other words, deeper grooves tend to result in increased shear yield stress and increased damping forces.

Although the surface treatment 38 shown in FIG. 5 includes two set of grooves 38a, 38b extending perpendicular to each other, it is recognized that other configurations of grooves or alternative surface treatment can be implemented. For example, the surface treatment could include a set of co-axial circular grooves of incrementally greater diameters extending away from the center axis. In some embodiments, the surface treatment could be arrays of geometrically shaped topographic features such as hemispheres, pyramids, and/or rectangular bodies; features formed by machining, etching, or the like; chemical treatments; coatings; arrays of other materials, etc.

In some embodiments in which the first surface 36a and the second surface 36b have a surface treatment, the surface treatments can be of the same type. In other embodiments, the first surface 36a has a surface treatment of a type different than the surface treatment of the second surface 36b. For example, the first and second surfaces 36a, 36b could have respective surface treatments each being two set of grooves extending perpendicular to each other, or the first surface 36a could have a surface treatment with two set of grooves extending perpendicular to each other and the second surface 36b could have a surface treatment that is a set of co-axial circular grooves of incrementally greater diameters.

In certain embodiments of internal and external MRF damper valves, the portion of the surface of the inlet-manifold plate located within the secondary valving region 31 and/or the portion of the surface of the valve-plate receiving cavity located within the primary valving region 30 can include a surface treatment for increasing the shear yield stress of columnized MRF particles passing by the surface. In this way, each of the opposing surfaces of the first and second valving regions 30, 31 can include a surface treatment. Although less preferable, it is recognized that the first and second surfaces of the valve plate 35 can be configured without a surface treatment while the inner surface of the inlet-manifold plate 27 and/or the inner surface of the valve-plate receiving cavity 61 can have a surface treatment.

Figure 8:
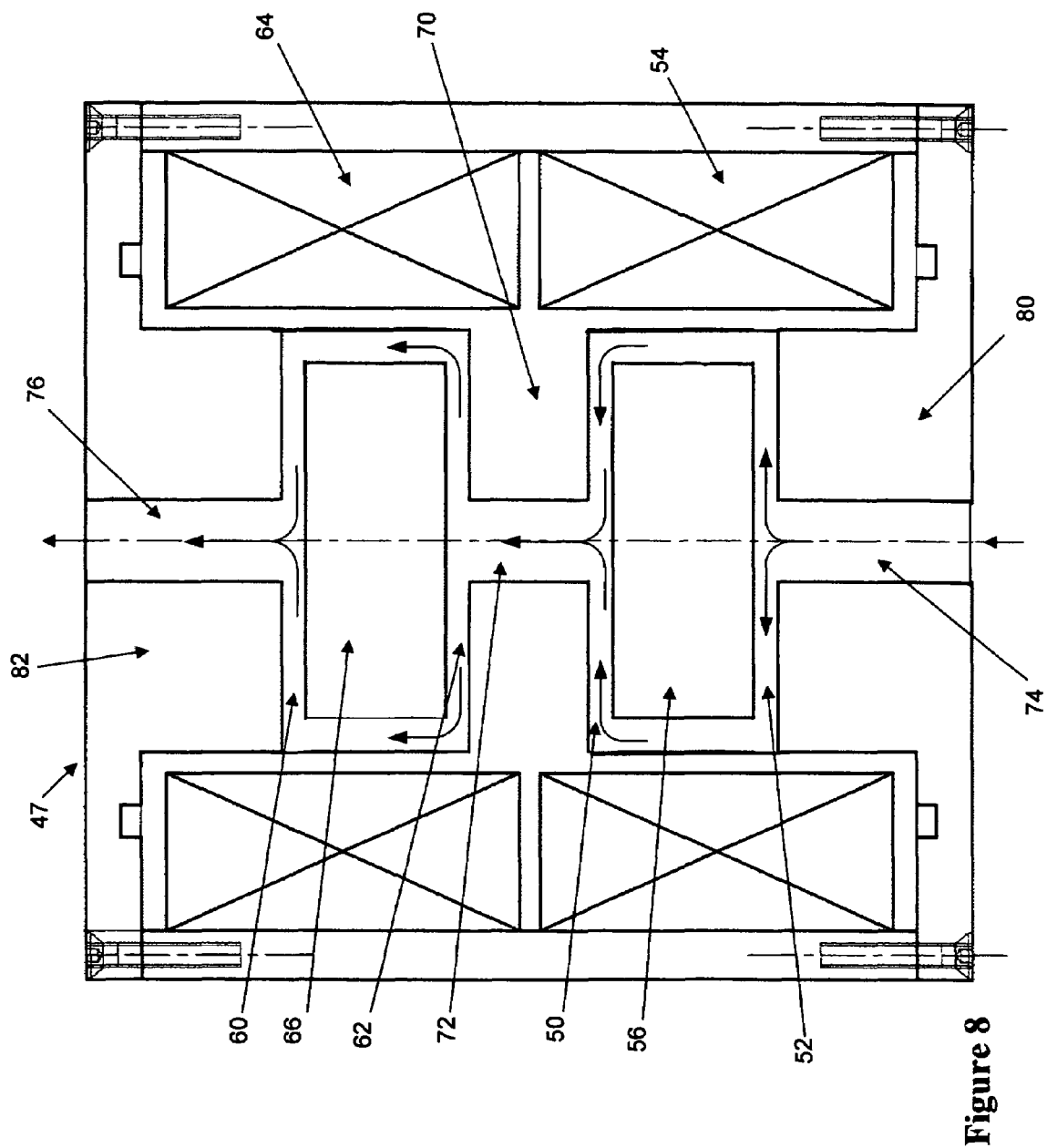
FIG. 8 is a cross-sectional view of a damper according to one embodiment having two internal MRF damper valves in series.

A third exemplary embodiment is shown in FIG. 8, in which an MRF damper valve 47 includes a first valving stage having a first primary valving region 50 and a first secondary valving region 52, and a second valving stage having a second primary valving region 60 and a second secondary valving region 62. The first valving stage includes a corresponding first magnetic coil 54 and first valve plate 56. The second valving stage includes a corresponding second magnetic coil 64 and a second valve plate 66. As illustrated in FIG. 8, the first valving stage and the second valving stage are configured with each other, in series, with an inner orifice 72 of a valve support member 70 fluidly coupling the stages together. The MRF damper valve 47 also includes an inlet manifold plate 80 having an inlet orifice 74 and an outlet-manifold plate 82 having an outlet orifice 76.

In operation, MRF flows into the MRF damper valve 49 through the inlet orifice 74 and diverges to flow through the first secondary valving region 52. The MRF continues to flow through a first passageway defined between the circumferential outer surface of the first valve plate 56 and the inner surface of the valve-support member 70 and into the first primary valving region 50. The MRF converges to flow through the inner orifice 72 and converges into the second secondary valving region 62 as the MRF flows out of the inner orifice. Similarly, the MRF continues to flow through a second passageway defined between the circumferential outer surface of the second valve plate 66 and the support valve-support member 70 and into the second primary valving region 60. The MRF then flows through the outlet orifice 76 prior to exiting the MRF damper valve 47.

Similar to the first and second embodiments previously described, the first magnetic coil 54 can be energized to produce a magnetic field that alters the characteristics of the MRF as the fluid flows through the first valving regions 50, 52 and the second magnetic coil 64 can be energized to produce a magnetic field that alters the characteristics of the MRF as the fluid flows through the second valving regions 60, 62. Accordingly, positioning first and second valving stages, each comprising a respective primary valving region and a respective secondary valving region, in series advantageously provides increased control of the MRF characteristics as the MRF flows through the valve.

Although the embodiment illustrated in FIG. 8 comprises two valving stages connected together in series, it is recognized that more stages can be configured in series to provide even greater control over the MRF characteristics. Alternatively, or in addition, two or more stages can be connected together in parallel. Furthermore, one or more of the surfaces of the valve plates, support members, or manifold plates within the valving regions can include a respective surface treatment to increase the shear yield stress of the MRF as described above.

The MRF damper valve 47 of this embodiment can be internally contained within a piston or be housed externally to the piston. With some embodiments in which the MRF damper valve 47 is internal, although the two valving stages in series shown in FIG. 8 would be contained in a single piston, it is recognized that multiple pistons containing one or more valving stages can be positioned in series. Regarding some embodiments in which the damper valve 49 is external, the two or more valving stages in series can comprise a first external housing containing one or more valving stages connected in series with a second external housing containing one or more valving stages. In other embodiments, more than two external housings having one or more respective valving stages can be coupled in series.

It is appreciated that, in some embodiments of a controllable MRF damper device, while in an off-state, i.e., no electrical activation current applied to the electromagnet(s), the device can still provide significant viscous damper forces or pressure drops across the device. This allows for a fail-safe mode of operation in the event of an electrical system failure. For example, multiple electromagnetic configurations are possible to facilitate pressure drops in the device when in the off-state. Although not required, these configurations can include permanent magnets. Also exemplary is the use of multiple inlet and or outlet ports to provide additional passageways that can act to increase the pressure drop in the off-state.

In some embodiments, the damping device can include at least one spring or spring-like element in series or parallel to provide spring-dashpot effects. A spring can provide, for example, a bias to the damper such that the piston preferably assumes a first position (e.g., at one end of a stroke) rather than a second position (e.g., at the other end of the stroke). Spring-dashpot effects are characterized by a controlled rate of extension or retraction of the rod from the cylinder under load.

Although axial motion of a movable piston or other object has been described above, other motions, such as rotary motion or combinations of linear and rotary motions, of movable pistons or other objects can be applied in the damper devices of the present application.

Generally, the components of controllable MRF devices of the present application can be made from a ferrous material such as mild steel, a non-ferrous material such as stainless steel, aluminum alloy, other metal, polymeric material, or other composite material, or combination thereof.

Having illustrated and described the principles of the disclosed embodiments, it will be apparent to those skilled in the art that the embodiments can be modified in arrangement and detail without departing from such principles. In view of the many possible embodiments, it will be recognized that the described embodiments include only examples and should not be taken as a limitation on the scope of the invention. Rather, the invention is defined by the following claims. We therefore claim as the invention all possible embodiments and their equivalents that come within the scope of these claims.

We claim:

1. A motion-damping device having a movable piston, comprising:
   a first valving stage comprising a first primary valving region defining a first passageway having a first height coupled to a first secondary valving region defining a second passageway having a second height, wherein a first valve plate is positioned between the first primary valving region and the first secondary valving region;
   a second valving stage in series with the first valving stage, the second valving stage comprising a second primary valving region defining a third passageway having a third height coupled to a second secondary valving region defining a fourth passageway having a fourth height, wherein a second valve plate is positioned between the second primary valving region and the second secondary valving region;
   first, second and third orifices coaxially aligned with the movable piston, wherein the first orifice has a first diameter and is communicable in fluid flowing communication with the first primary valving region, the second orifice has a second diameter and is communicable in fluid flowing communication with the first secondary and second primary valving regions, and the third orifice has a third diameter and is communicable in fluid flowing communication with the second secondary valving region;
   a magneto-rheological fluid (MRF) contained in the first and second primary valving regions and the first and second secondary valving regions in a manner allowing the MRF to flow through said valving regions;
   a first magnet configured to produce a magnetic field within at least one of the first primary valving region and the first secondary valving region; and
   a second magnet configured to produce a magnetic field within at least one of the second primary valving region and the second secondary valving region;
   wherein motion of the piston is damped by the flow of MRF through the first primary and secondary valving regions and the second primary and secondary valving regions as the first and second magnets produce their respective magnetic fields, and
   wherein a first ratio of the first height and the first diameter, a second ratio of the second height and the second diameter, a third ratio of the third height and the second diameter, and a fourth ratio of the fourth height and the third diameter are each greater than approximately 0.3.

2. The motion-damping device of claim 1, wherein:
   the first valve plate comprises a first surface defining a boundary of the first primary valving region and a second surface defining a boundary of the first secondary valving region;
   the second valve plate comprises a first surface defining a boundary of the second primary valving region and a second surface defining a boundary of the second secondary valving region; and
   at least one of the first and second surfaces of the first and second valve plates comprise a treated surface, the treated surface being configured to impart a significantly increased shear yield stress to columnized MRF particles passing over the surface, compared to an otherwise similar untreated surface.

3. The motion-damping device of claim 2, wherein the treated surface comprises a first set of parallel grooves extending in a first direction and a second set of parallel grooves extending in a second direction perpendicular to the first direction.

4. The motion-damping device of claim 1, wherein:
   the piston is movably disposed within a cylindrical housing; and
   at least the first and second primary valving regions, the first and second secondary valving regions, and the first and second valve plates are contained within the piston.

5. The motion-damping device of claim 1, wherein:
   the piston is movably disposed within a cylindrical housing; and
   at least the first and second primary valving regions, the first and second secondary valving regions, and the first and second valve plates are external to the cylindrical housing.

6. The motion-damping device of claim 1, wherein the valving regions comprise a generally disk-shaped space, and wherein the valving regions are generally parallel to each other.

7. The motion-damping device of claim 1, wherein the valve plates are generally disk-shaped.

8. The motion-damping device of claim 1, wherein the each magnet comprises an electromagnetic coil, a permanent magnet, or a combination thereof.

* * * * *